United States Patent [19]

Kihara

[11] 4,095,278

[45] June 13, 1978

[54] INSTRUCTION ALTERING SYSTEM

[75] Inventor: Toshimasa Kihara, Kodaira, Japan

[73] Assignee: Hitachi, Ltd., Japan

[21] Appl. No.: 729,983

[22] Filed: Oct. 6, 1976

[30] Foreign Application Priority Data

Oct. 8, 1975  Japan .................................. 50-120702

[51] Int. Cl.² .............................................. G06F 9/06
[52] U.S. Cl. .................................................. 364/900
[58] Field of Search ...... 364/200 MS, 900 M, 900 MS

[56] References Cited

U.S. PATENT DOCUMENTS 3,753,244  8/1973  Sumilas ............................. 364/200
3,875,391  4/1975  Shapiro ............................. 364/200

Primary Examiner—Harvey E. Springborn
Attorney, Agent, or Firm—Craig & Antonelli

[57] ABSTRACT

An instruction altering system to be used with a program control system including a storage device for storing instructions, wherein when the operation code of an instruction which is about to be executed coincides with the operation code of an instruction to be changed or altered, a multiplexer is switched by the coincidence output of a comparator circuit, and the operation code of a second stored instruction is gated instead to the storage device in place of the first mentioned operation code.

5 Claims, 4 Drawing Figures

4,095,278

INSTRUCTION ALTERING SYSTEM

BACKGROUND OF THE INVENTION

This invention relates in general to an information processing system, and more particularly, to a circuit for altering operation codes of a macroinstruction or an instruction.

A microprogram control system is a control system for information processing systems of the type proposed by M. V. Wilkes et al in an article entitled "Microprogramming and the Design of Control Circuits in an Electrical Digital Computer" found in the proceedings of the Cambridge Philosphical Society, Volume 49, pages 230–238 and by Yaohan Chu as an article entitled "Digital Computer Design Fundamentals" on pages 246–247, FIG. 12.30. According to such a control system, an operation corresponding to a macroinstruction is decomposed into several basic operations, and the basic operations are respectively defined as a microinstruction. In executing the macroinstruction, a macroinstruction signal is decoded by an address decoder, and the first address of a microprogram routine which consists of a plurality of microinstructions or microorders corresponding to the macroinstruction is accessed. Thereafter, the microprogram routine instructions of the routine are sequentially accessed and executed. When it is detected that the microprogram routine corresponding to the macroinstruction has been fully completed, the execution of the macroinstruction is terminated.

As a memory for storing the microprogram routines, a ROM (read only memory) is usually employed In this case, the operation code of an identical macroinstruction alwys designates a predetermined microprogram routine corresponding to the macroinstruction and performs a fixed microprogram routine. By way of example, consider a case where the microprogram routine in the ROM is designed so as to execute the operation of addition (ADD) when the operation code of a macroinstruction word is '0001.' Then, whenever the operation code is '0001,' the ADD function is performed. Since it is usually impossible to rewrite the microprogram routine stored in the ROM during the program execution, another microprogram cannot be addressed using the same macroinstruction.

Where it is necessary to enable many kinds of instructions to be executed, the number of bits of the operation code of an instruction word must be made large. This naturally leads to an increase in the instruction word length which may not be desirable or possible depending upon the system. For example, when four digits or bits have been assigned for the instruction word length, then $2^4$ or 16 different instructions may be addressed. When access to more than 16 instructions is required, prior art systems would be required to add one or more extra digits or bits to the original four digit instruction word.

SUMMARY OF THE INVENTION

Accordingly, it is an object of this invention to provide a novel instruction altering system for an information processing system which can address more instructions than the the number of digits or bits in the operation code would normally allow.

Another object of this invention is to provide a novel instruction altering system for an information processing system which can alter a specific operation corresponding to an instruction code of a predetermined instruction word in the course of the execution of a program.

Yet another object of this invention is to provide a novel instruction altering system for an information processing system which can alter the operation corresponding to a macroinstruction in the course of the information processing operation without rewriting the contents of the memory for storing microprograms.

The present invention accomplishes the above-stated objects by providing a first logic circuit to hold an address or operation code for an instruction to be altered and to compare that held address or operation code with the address or operation code of an instruction to be executed, and a second logic circuit controlled by an output from the first logic circuit for delivering either address or operation code of the instruction to be executed or the address or operation code for a second instruction as an output, the address or operation code for the second instruction being delivered as the output from the second logic circuit when the first logic circuit provides a coincidence signal to the second logic circuit indicating that the held address or operation code is identical to the address or operation code of the instruction to be executed.

PREFERRED EMBODIMENTS OF THE INVENTION

Hereunder, this invention will be described in connection with various exemplary embodiments.

Figure 1:
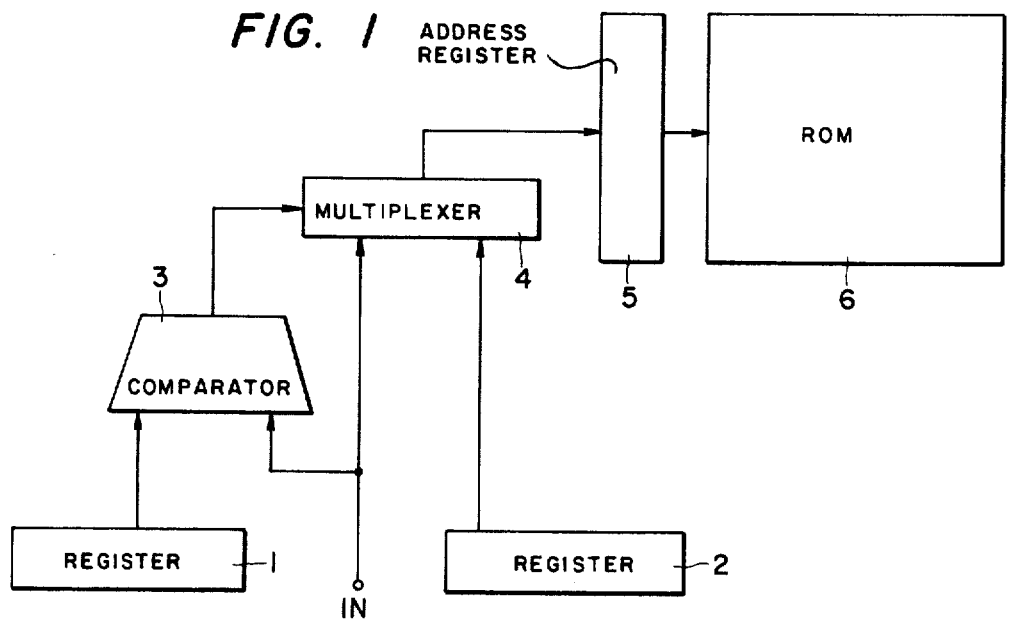
FIG. 1 is a block diagram showing the fundamental construction of this invention.

FIG. 1 shows an embodiment of this invention, in which numeral 1 denotes a register for storing therein the operation code of one macroinstruction (macroinstruction operation code to be altered) which is the object of alteration. Numeral 2 denotes a register for storing therein the operation code of a new macroinstruction (altered macroinstruction operation code) which is to be transmitted to an address register instead of the macroinstruction operation code to be altered which is stored in the register 1. A judging circuit 3 compares the operation code of a macroinstruction which is about to be executed as applied to an address input terminal IN and the content of the register 1 which stores therein the macroinstruction operation code to be altered, and it judges whether they coincide or not. Numeral 4 indicates a multiplexor which is controlled by the output of the judging circuit 3. Numeral 5 represents an address register, and numeral 6 a ROM for storing microprograms therein.

By way of example, consider a case where, when the operation code of a macroinstruction work is '0001,' the first address of a microprogram routine which executes an addition (ADD) stored in the ROM 6 is accessed without any alteration, and where, in the course of the execution of a series of information processings, there occurs the necessity for executing an instruction other than ADD, for example, a subtraction (SUB) operation in the place of the operation code '0001.' In such case, the macroinstruction operation code to be altered '0001' is stored in the register 1, while a signal (altered macroinstruction operation code) for designating the first address of a microprogram routine which realizes the macroinstruction SUB, for example '1111,' is stored in the register 2.

When the operation code of the macroinstruction presently about to be executed is applied to the address input terminal IN is '0001,' it coincides with the content '0001' of the register 1, and a control signal (coincidence signal) is transmitted from the judging circuit 3 to the multiplexor 4. Thus, switching is effected in the multiplexor 4, and the content '1111' of the altered macroinstruction code stored in the register 2 is transmitted from the multiplexor 4 to the address decoder in place of the operation code of the macroinsruction presently about to be executed, which is inputted to the terminal IN. The first address of the microprogram routine which realizes SUB and which is accumulated within the ROM 6 is accessed, and a series of microinstructions are executed in a predetermined sequence.

When it is unnecessary to alter the actual operation corresponding to the macroinstruction, the content of the register 2 is made to be identical to that of the register 1, or alternatively, the output of the judging circuit 3 is inhibited. Then, the operation code of the macroinstruction presently about to be executed, as received at the address input terminal IN, is fed through the multiplexor 4 to the address register 5 without any change.

Figure 2:
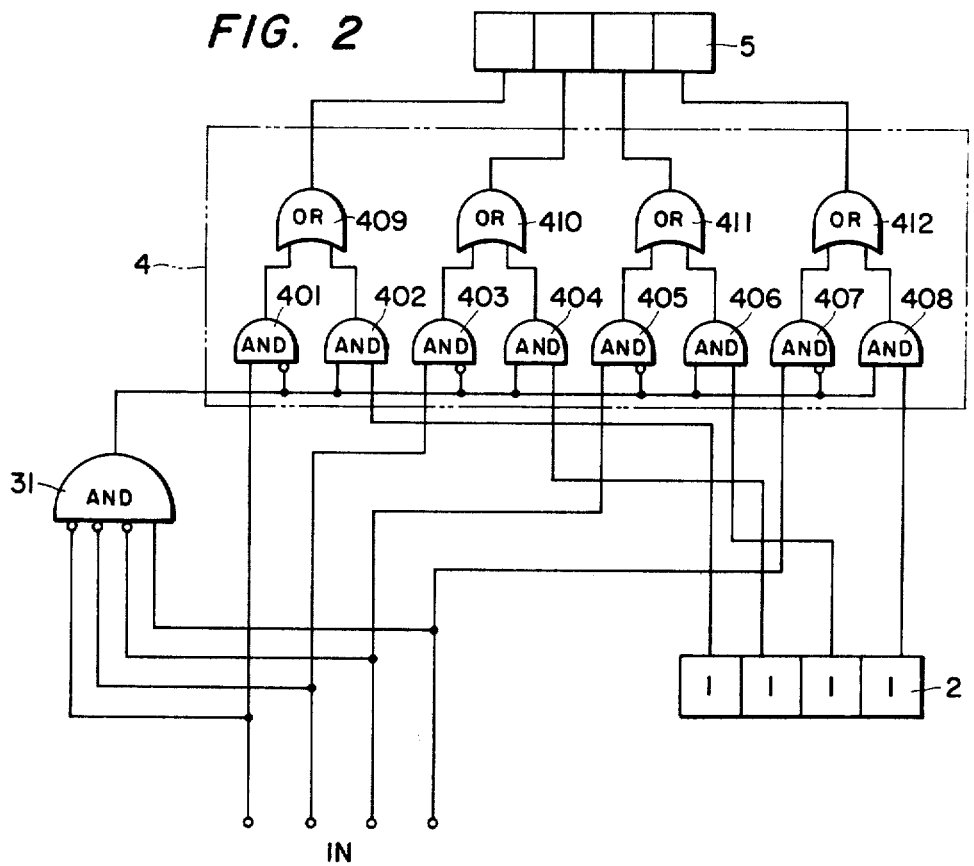
FIG. 2 is a circuit diagram showing an embodiment of this invention.

FIG. 2 shows an embodiment of this invention in the case where the macroinstruction operation code to be altered is fixed to a specific code '0001' by the wired logic of gate 31. It specifies the macroinstruction to be altered by connecting inverters to specific terminals on the input side of a logic product gate 31.

In the embodiment shown in FIG. 2, when the operation code '0001' of a macroinstruction is applied to an address input terminal IN, an operation code '1111' stored in a register 2 is transmitted to an address register 5 in lieu of the operation code '0001' due to the inhibiting of gates 401, 403, 405, and 407 and the enabling of gates 402, 404, 406, and 408 from the output of gate 31. The contents of the register 2 are thus transferred through gates 402, 404, 406, and 408, as well as gates 409 – 412 to the register 5. As a result, the information processing system performs an operation which corresponds to the operation code '1111,' not to the code '0001.' It is understood that the circular symbol connected at the sides of certain of the gates in FIG. 2 and subsequent Figures is the standard symbol for an inverter.

Figure 3:
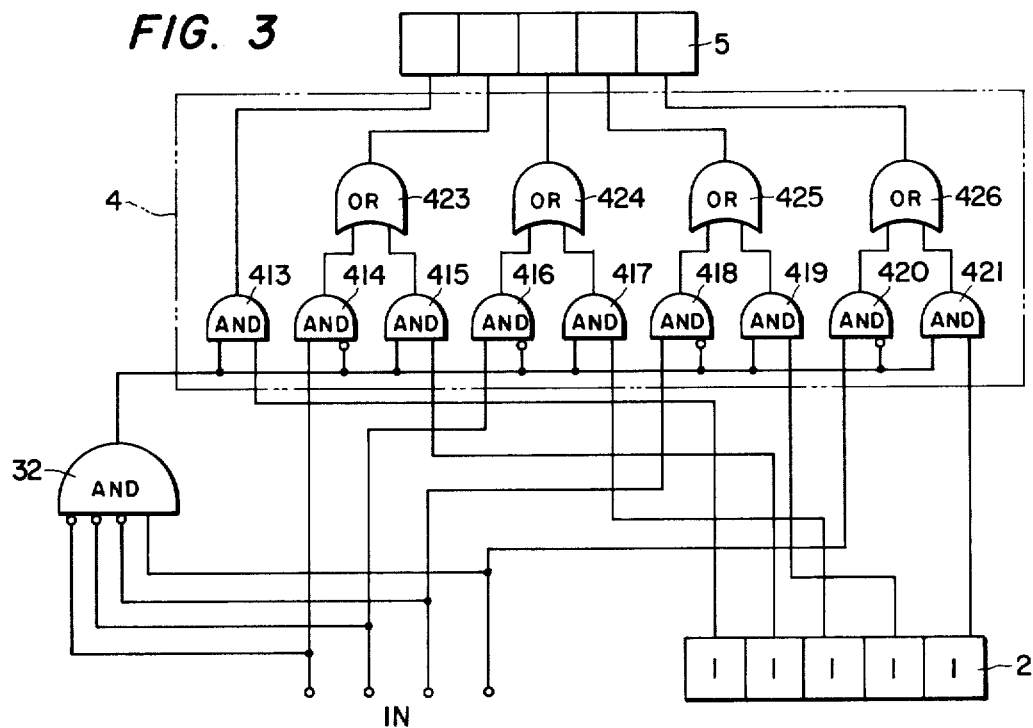
FIG. 3 and FIG. 4 are circuit diagrams each showing another embodiment of this invention.

FIG. 3 shows another embodiment of this invention which is similar to the embodiment of FIG. 2, and wherein the macroinstruction operation code to be altered is similarly fixed by the wired logic. In the present embodiment, however, when an operation code '0001' of 4 bits is applied to an address input terminal IN, an operation code '11111' of 5 bits is transmitted to an address register 5 in place thereof.

Figure 4:
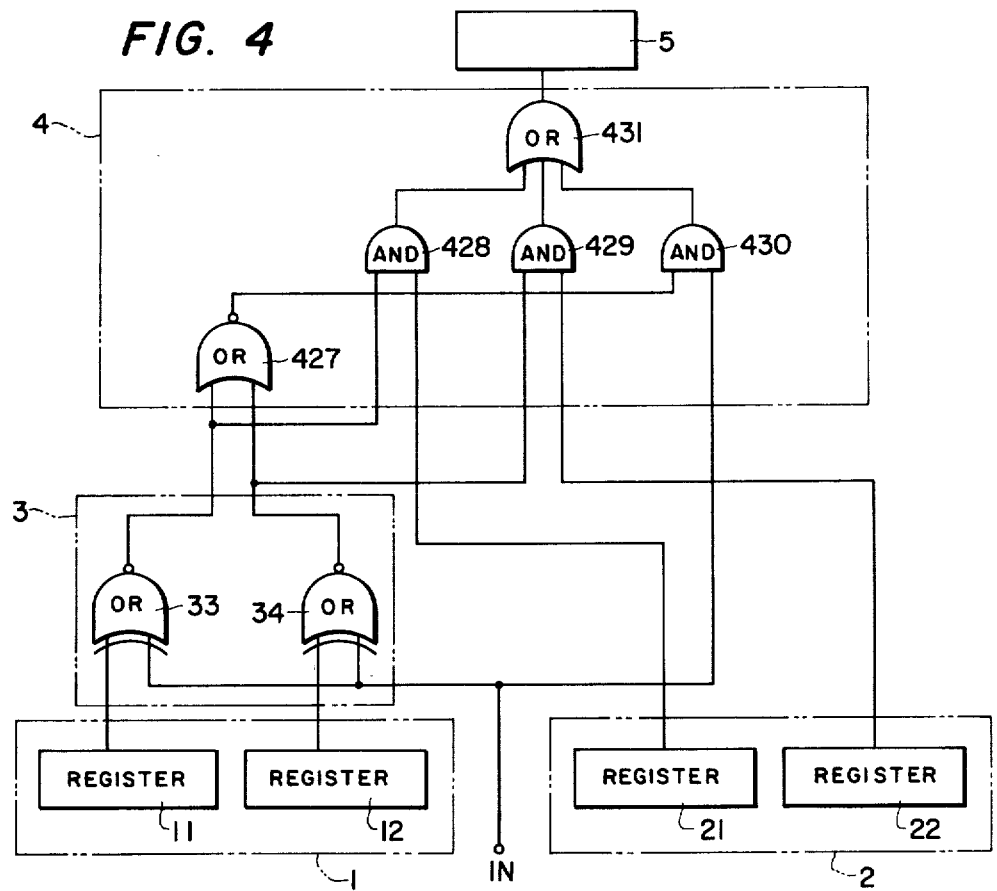

FIG. 4 is a circuit diagram of still another embodiment of this invention which can perform two sorts of alterations for the content of a code corresponding to a macroinstruction.

Thus, by way of example, this circuit permits both the operation code of an instruction word designating ADD to be altered to SUB and that when the operation code designating AND it can be altered to NOP (no operation).

Numeral 11 denotes a register for storing therein one macroinstruction code to be altered, numeral 21 a register for storing therein an altered macroinstruction operation code which is executed instead of the instruction stored in the register 11. Numeral 12 denotes a register for storing therein another macroinstruction code to be altered macroinstruction operation code which is executed instead of the instruction stored in the register 12.

For example, where the operation code of the macroinstruction which is presently about to be executed is applied to an address input terminal IN and coincides with the macroinstruction operation code to be altered stored in the register 11, an output of level "1" is applied to one input terminal of an AND circuit 428 by the output of a coincident logic circuit 33. As a result, the altered macroinstruction operation code stored in the register 21 is transmitted through the AND circuit 428 and an OR circuit 431 to an address register 5. Likewise, when the operation code of the macroinstruction which is presently about to be executed is applied to the address input terminal IN and is identical to the macroinstruction operation code to be altered stored in the register 12, an output of level "1" is applied to one input terminal of an AND circuit 429 from the output of a coincident logic circuit 34. As a result, the altered macroinstruction operation code stored in the register 22 is transmitted through the AND circuit 429 and the OR circuit 431 to the address register 5.

When the address input coincides neither with the stored content of the register 11 nor with that of the register 12, one input terminal of an AND circuit 430 is made "1" by the output of a NOR circuit 427. Therefore, the operation code of the macroinstruction which is applied to the address input terminal IN is transmitted through the AND circuit 430 as well as the OR circuit 431 to the address register 5 without any change.

In this invention, as explained above, the numbers of digits of the registers and the multiplexer may be the numbers of digits which need be altered, and bits which do not concern the alteration of the operation code are directly coupled with an effective address register. However, the comparison between the signal applied to the address, i.e., operation code, input terminal IN and the macroinstruction operation code to be altered must be made over all the digits.

In this manner, according to the present invention, when the operation code of the macroinstruction which is presently about to be executed and is applied to the address input terminal IN coincides with the address, i.e. operation code, to be altered (the operation code of the macroinstruction to be altered), the multiplexor is switched by the output of the judging circuit, the operation code of the altered macroinstruction stored in the register 2 is outputted to the address register of the ROM for storing microprograms as the address of the ROM in place of the operation code of the macroinstruction which is about to be executed. Therefore, the first address of the microprogram routine corresponding to the altered macroinstruction operation code is selected. As a result, it becomes possible to alter the actual operation of the macroinstruction.

Thus, the actual operation corresponding to the macroinstruction can be altered without rewriting of data in the ROM for storing microprograms. The timing of such alteration is the point when various addresses, e.g., addresses designated by a so-called operand of an instruction, have been altered and determined in the course of the execution of information processing. Therefore, the kind of macroinstruction is surely the same at a certain point of time. As viewed from the aspect of the whole job, however, the kind of macroinstruction increases. Consequently, whereas usually only $2^5$ kinds of macroinstructions can be executed when only 5 bits are allotted to the operation code of an instruction word, over $2^5$ kinds of macroinstructions can be executed according to this invention.

This invention is applicable to computers, especially microprogram-controlled computers, and other control circuits.

What is claimed is:

1. An instruction altering system to be used with program and microprogram control systems having instruction storage means and address register means connected with said instruction storage means comprising:

first register mean for storing an operation code for an instruction stored in said storage means which is to be altered;

second register means for storing a second operation code for an instruction stored in said storage means;

input means for providing an operation code of an instruction which is to be executed;

comparator means connected with said first register means and said input means for comparing said first operation code and said operation code of the instruction which is about to be executed and for generating a coincidence signal when said codes coincide; and multiplexer means connected with said second register means, said input means, said comparator means and said address register means for transferring said second operation code to said address register instead of the operation code of said instruction which is about to be executed when said coincidence signal is received from said comparator means.

2. The information processing system according to claim 1, wherein said storage means is a read only memory.

3. The information processing system according to claim 1, wherein said first register means and said multiplexer means are provided in the form of gate means having a plurality of inputs with said connection between said multiplexer means and said input means comprising the connection of the plurality of inputs from said gate means to said input means in order to receive the respective bits of said operation code which is to be executed, said gate means being logically set in accordance with said operation code contained in said first register means so as to compare said operation code set on said gate means to the operation code on said third input means and to provide a coincidence signal only when said codes coincide.

4. The information processing system according to claim 1, wherein said first register means comprises first and second registers each for containing an operation code for an instruction stored in said storage means which is to be altered, said second register means comprises third and fourth registers each for containing an operation code for an instruction stored in said storage means, and said comparator means comprises a first coincident gate arrangement connected to said first register and said input means and a second coincident gate arrangement connected to said second register and said input means, said multiplexer means including first gate means for passing the contents of said third register upon receipt of an output from said first coincident gate arrangement, second gate means for passing the contents of said fourth register upon receipt of an output from said second coincident gate arrangement, and third gate means for passing said operation code which is about to be executed as received from said input means in the event neither of said first and second coincident gate arrangements produces an output.

5. The information processing system accordng to claim 4, wherein said storage means is a read only memory.

* * * * *